US009922507B2

(12) United States Patent
Crooks

(10) Patent No.: US 9,922,507 B2
(45) Date of Patent: Mar. 20, 2018

(54) SELF-LEARNING SUPPRESSION OF SECONDARY BARCODES

(71) Applicant: John Crooks, Duluth, GA (US)

(72) Inventor: John Crooks, Duluth, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 14/698,165

(22) Filed: Apr. 28, 2015

(65) Prior Publication Data

US 2016/0321878 A1    Nov. 3, 2016

(51) Int. Cl.
| | | |
|---|---|---|
| *G06F 17/00* | (2006.01) | |
| *G06K 7/10* | (2006.01) | |
| *G06F 19/00* | (2011.01) | |
| *G07G 1/00* | (2006.01) | |
| *G07G 1/14* | (2006.01) | |
| *G06K 17/00* | (2006.01) | |

(52) U.S. Cl.
CPC ....... *G07G 1/0045* (2013.01); *G06K 7/10544* (2013.01); *G06K 17/0022* (2013.01); *G07G 1/14* (2013.01)

(58) Field of Classification Search
USPC .............. 235/375, 383, 385, 462.01, 462.14, 235/462.45, 462.15, 462.25
See application file for complete search history.

(56) References Cited

U.S. PATENT DOCUMENTS 6,712,268 B1 *  3/2004  Mason .............. G06F 17/30879
                                                235/380
7,108,170 B2    9/2006  McQueen et al.
2004/0117250 A1 *  6/2004  Lubow ................ G06Q 20/342
                                                705/14.17
2006/0100925 A1 *  5/2006  Finaly .................. G06Q 20/387
                                                705/14.35
2008/0154676 A1 *  6/2008  Suk ........................ G06Q 30/02
                                                705/14.26
2011/0245284 A1 * 10/2011  Greul ................... C07D 239/48
                                                514/275

(Continued)

FOREIGN PATENT DOCUMENTS

EP          1313058          5/2003

OTHER PUBLICATIONS

European Search Report issued in co-pending European patent application EP15197674.3 dated Mar. 7, 2016.

*Primary Examiner* — Tuyen K Vo
(74) *Attorney, Agent, or Firm* — Schwegman, Lundberg & Woessner; Paul W. Martin

(57) ABSTRACT

Various embodiments herein each include at least one of systems, devices, methods, and software for self-learning suppression of secondary barcodes. One such embodiment, in the form of a method, includes receiving barcode data read by a barcode scanning device and determining whether the barcode data is stored in a local database. In such embodiments, when the barcode data is not stored in the local database, the method sends the barcode data to a transaction processing system. Otherwise, when the barcode data is stored in the local database, the method includes executing at least one function associated with the barcode data stored in the local database, such as ignoring the barcode data and causing a barcode reading device to search for another barcode to read.

16 Claims, 3 Drawing Sheets

(56) References Cited

U.S. PATENT DOCUMENTS

| | | | |
|---|---|---|---|
| 2012/0066048 A1* | 3/2012 | Foust | G06Q 20/387 |
| | | | 705/14.26 |
| 2012/0095823 A1* | 4/2012 | Tak | G06Q 30/0238 |
| | | | 705/14.38 |
| 2012/0203647 A1* | 8/2012 | Smith | G08B 13/246 |
| | | | 705/23 |
| 2015/0278752 A1* | 10/2015 | Ishii | G06Q 10/06311 |
| | | | 705/7.15 |

* cited by examiner

SELF-LEARNING SUPPRESSION OF SECONDARY BARCODES

BACKGROUND INFORMATION

Many grocery products now have one-dimensional (1D) and two-dimensional (2D) barcodes that contain codes and other information, in addition to a Universal Product Code (UPC) barcode, that is not always of interest to a Point-Of-Sale (POS) system. Frequently, a retailer needs to use these secondary symbologies for other purposes (e.g., coupons, loyalty cards, product serial numbers, etc.) that require the secondary symbologies be enabled on barcode scanners. Unfortunately, this leads to confusion when secondary barcodes are read by a barcode scanner prior to reading a primary barcode, such as a UPC. In such instances, a best case scenario is where the secondary barcode is not on file within a POS system and such an indication can be provided to prompt a rescanning of the product. In a worst case scenario, the secondary barcode read creates a "giveaway" situation where the user believes the item was successfully scanned when it was not.

SUMMARY

Various embodiments herein each include at least one of systems, devices, methods, and software for self-learning suppression of secondary barcodes. One such embodiment, in the form of a method, includes receiving barcode data read by a barcode scanning device and determining whether the barcode data is stored in a local database. In such embodiments, when the barcode data is not stored in the local database, the method sends the barcode data to a transaction processing system. Otherwise, when the barcode data is stored in the local database, the method includes executing at least one function associated with the barcode data stored in the local database, such as ignoring the barcode data and causing a barcode reading device to search for another barcode to read.

DETAILED DESCRIPTION

Figure 1:
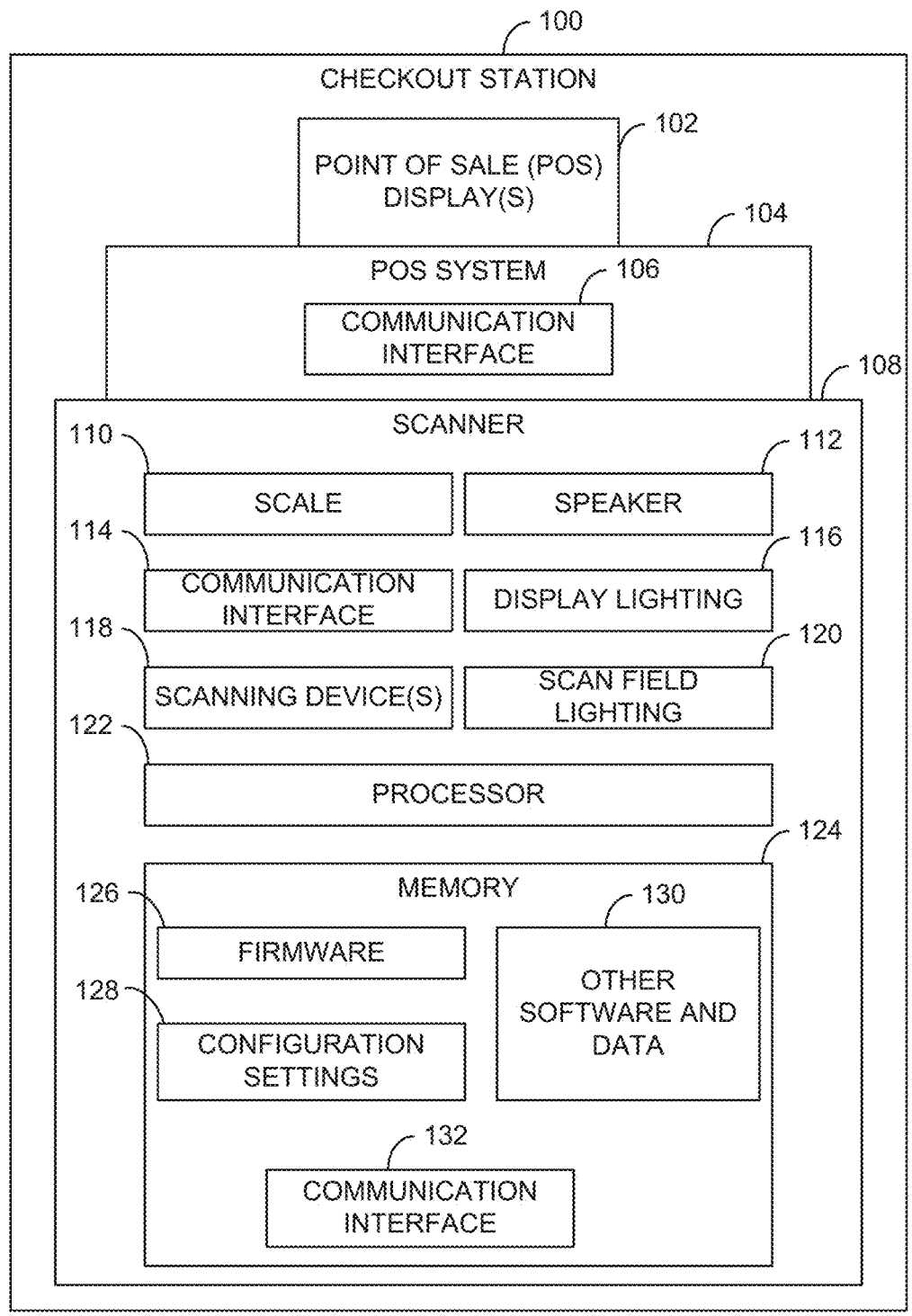
FIG. 1 is a diagram illustrating components of a checkout station having a scanner, according to an example embodiment.

Various embodiments herein each include at least one of systems, devices, methods, and software for self-learning suppression of secondary barcodes. For example, products in stores typically include a UPC that is scanned by a barcode scanner coupled to a POS terminal. The POS terminal utilizes data decoded from a scanned barcode to look up product information in a product database, such as a product description and a price. This data is then added to a bill of goods to be purchased. However, it has become common for products to include not only a UPC or other barcode utilized for such purposes, which can be considered a primary barcode, and one or more other barcodes, which can be considered secondary barcodes. Examples of secondary barcodes are barcodes that encode data such as product lot numbers, publication dates, freshness and expiration dates, among other data. While data of secondary barcodes may be useful and even important for some purposes, when data encoded in secondary barcodes is not needed or desired by a POS system, or other system that may process barcode data, reading and processing data of secondary barcodes slows operation of the scanner and terminal under use. Thus, the various embodiments herein provide solutions to address issues presented by products including secondary barcodes affixed thereto or otherwise printed thereon.

These and other embodiments that allow multiple local or remote personnel to become involved in servicing assistance requests and to facilitate handoff of assistance requests between personnel are described herein with reference to the figures. Other embodiments are also described such as where sensitive information is limited for presentation to only certain personnel and only via certain output mechanisms.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a diagram illustrating components of a checkout station 100 having a scanner 108, according to an example embodiment. It is to be noted that the checkout station 100 is shown schematically in greatly simplified form, with example components relevant to understanding various embodiments herein. The same situation may be true for the other various components of the checkout station 100. Note that the checkout station 100 may include more or fewer components in some embodiments.

Furthermore, the various components included in the FIG. 1 as illustrated and arranged are provided for illustration purposes only. It is to be noted that other arrangements with more or fewer components are possible without departing from the contributions herein, in particular with regard to automatic and remote scanner configuration.

Moreover, the methods and scanner presented herein and below may include all or some combination of the components shown in the context of the checkout station 100. Further, although a checkout station 100 is illustrated as including a scanner 108, the scanner 108 may be a stand-alone element or an element of other systems, devices, and terminals in other embodiment. Examples of other terminal-types that may include a scanner 108 are self-service terminals (SSTs), clerk operated and self-service library checkout stations, time-keeping terminals, Pay-at-the-Pump terminals on a fuels pump at a fueling station, and the like.

The methods of some embodiments are programmed as executable instructions in memory and/or non-transitory computer-readable storage media and executed on one or more processors and other such data processing devices associated with the components and devices herein.

The checkout station 100 includes one or more POS displays 102 that present information of a POS system 104 coupled to the one or more POS displays. Information presented by the one or more POS displays includes information relevant in a retail context and with regard to operation of the checkout station. The checkout station 100 also includes the scanner 108.

The scanner 108 may be referred to as a barcode scanner as that is the task most commonly associated with such devices. An example of such a barcode scanner is the NCR RealScan™ 7879 Bi-Optic Imager available from NCR Corporation of Duluth, Ga. During operation of the checkout station 100, items are placed within a scan field of the scanner 108. One or more scanning devices 118 of the scanner 108, such as one or more of a camera and a laser scanner then scan a barcode and information read therefrom is communicated to the POS system 104. The POS system 104 then uses that data to identify the item placed within the scan field of the scanner 108 and performs an additional function. The additional function may include a price lookup and addition of the item to a list of items to be purchased, which may be presented on the one or more POS displays 102.

The scanner 108 may include one or more scan fields, such as two scan fields of bi-optic scanners that are commonly seen in grocery and discount retail outlets. In addition to the scanning devices 118, the scanner 108 may include various other components. The various other components may include an integrated scale 110 such as may be used in a grocery outlet to weigh produce and one or both of a speaker 112 and display lighting 116 to output audio a visual signals such as signals of (un)successful scans. The scanner 108 may also include scan field lighting 120 that may be turned on and off and adjusted based on a detected presence of an item to be scanned.

During typical operation, the scanner 108 is operated according to instructions executed on a processor 122. The processor may be an application integrated circuit (ASIC), digital signal processor, microprocessor, or other type of processor. The instructions may be firmware 126 or software 130 stored in one or more memories 124. The one or more memories 124 may be or include volatile and non-volatile memories, write-protected memories, write-once memories, random access memory (RAM), read only memories (ROM), and other memory and data storage types and devices.

The instructions as may be stored in firmware 126 or as software 130 in memory 124 are executed according to configuration settings stored in the memory 124. The configuration settings 128 configure operation of the scanner 108, the various components, both hardware and software, therein. For example, the configuration settings 108 may configure speaker 112 volume, display lighting 116 outputs, scan field lighting 120 brightness, decoding algorithm of the scanning device(s) 118 and the instructions, one or more communication protocols used to communicate data from the scanner 108 to the POS system 104, such as via a wired or wireless communication interface 106 of the POS system 104 to a physical communication interface device 114 or virtualized communication interface 132 of the scanner 108. For example, in some embodiments, the communication interface 106 of the POS system 104 is accessible from the scanner 108 as a virtualized communication interface 132 as may be maintained in the memory 124 by a process that executes on the processor 122. Each of the communication interfaces 106, 114 may be wired or wireless communication interface devices, such as a wired Ethernet device, a wireless Ethernet device (e.g., a device capable of communicating according to one or more of the 802.11 standards), Bluetooth® device, a mesh network device or other peer-to-peer type networking device, a mobile network data communication device, and the like.

In some instances, a product placed with the scan field of the scanner 108 may include a primary barcode, such as a UPC, and one or more secondary barcodes that may be present on the product for various purposes. Such purposes may include an encoded lot number, publication date or freshness, manufactured, or expiration date, depending on the particular product. In some instances, the secondary barcode data may be needed to process or track the product being sold. However, in other instances, the secondary barcode is not needed. However, when a secondary barcode is read, a typical scanner will communicate barcode data from a scanned secondary barcode to the POS system 104. When this barcode data is not needed or cannot be processed by the POS system 104, operation of the POS system 104 is slowed as the POS system 104 returns a signal to the scanner 108 indicating a bad barcode read condition. The product must then be rescanned to obtain a read of the proper barcode, such as the UPC. This may result in a scan of the secondary barcode, which further slows operation. Various embodiments herein address this situation by maintaining a database local to the scanner 108, such as may be stored in configuration settings 128 present in a memory 124 of the scanner 108. This local database, in some embodiments, is a self-learned database that is built or augmented over time as bad barcode reads are communicated back to the scanner 108 by the POS system 104. In some embodiments, the local database may also or alternatively be obtained or augmented with data from a barcode database maintained on a network and accessed by the scanner 108 via a communication interface 114 of the scanner 108. As mentioned elsewhere herein, the communication interface 114 may be a network interface device, such as a wired or wireless Ethernet device. In some embodiments, data from the local database may also be communicated via the communication interface 114 to a network service that synchronizes barcode data in the barcode database maintained on the network.

In some embodiments, the software 130 stored in memory 124 includes instructions executable on the processor 122 to automatically set the configuration settings 128, such as upon scanner 108 installation, completion of scanner 108 maintenance, or other times with regard to the scanner 108.

In some embodiments, the software 130 stored in the memory 124 includes instructions executable by the processor 122 to suppress processing of data read from secondary barcodes in view of a local database of secondary barcode data also stored in the memory 124, such as in or with the configuration settings 128.

In some embodiments, a group of scanners 108 deployed on a network may share a database of barcode data accessible via a network by communication interfaces 114 of the respective scanners 108. In other embodiments, the various scanners 108 may synchronize their local barcode databases in a Peer-to-Peer (P2P) manner or via a network service or shared database accessible via the network.

In some embodiments, a database of barcode data may simply include barcode data that is to be ignored when encountered by the scanner 108. For example, the scanning device 118 may scan and decode a barcode and firmware 126 or other software 130 may execute on the processor 122 to query the local database of barcode data to see if the scanned barcode data is present therein. In such embodiments, when the barcode data is present in the local database, the barcode data is simply ignored and the scanning device 118 is returned to a barcode searching and scanning mode. In other embodiments, barcode data stored in the local database may include records of barcode data including barcode data of one barcode and a rule or an association to a rule where the rule includes instructions or association to instructions that are to be performed upon the scanner 108 encountering the barcode data. The instruction may include an instruction to ignore the barcode data, submit the barcode data to another system such as a POS system, to request additional information from a customer such as a date of birth or driver's license which may also be scanned, triggering of a process to load a value to pre-paid gift or debit card, and the like. Thus, the local database, or other database as described herein, that stores barcode data may be take different forms and store different data in various embodiments.

Figure 2:
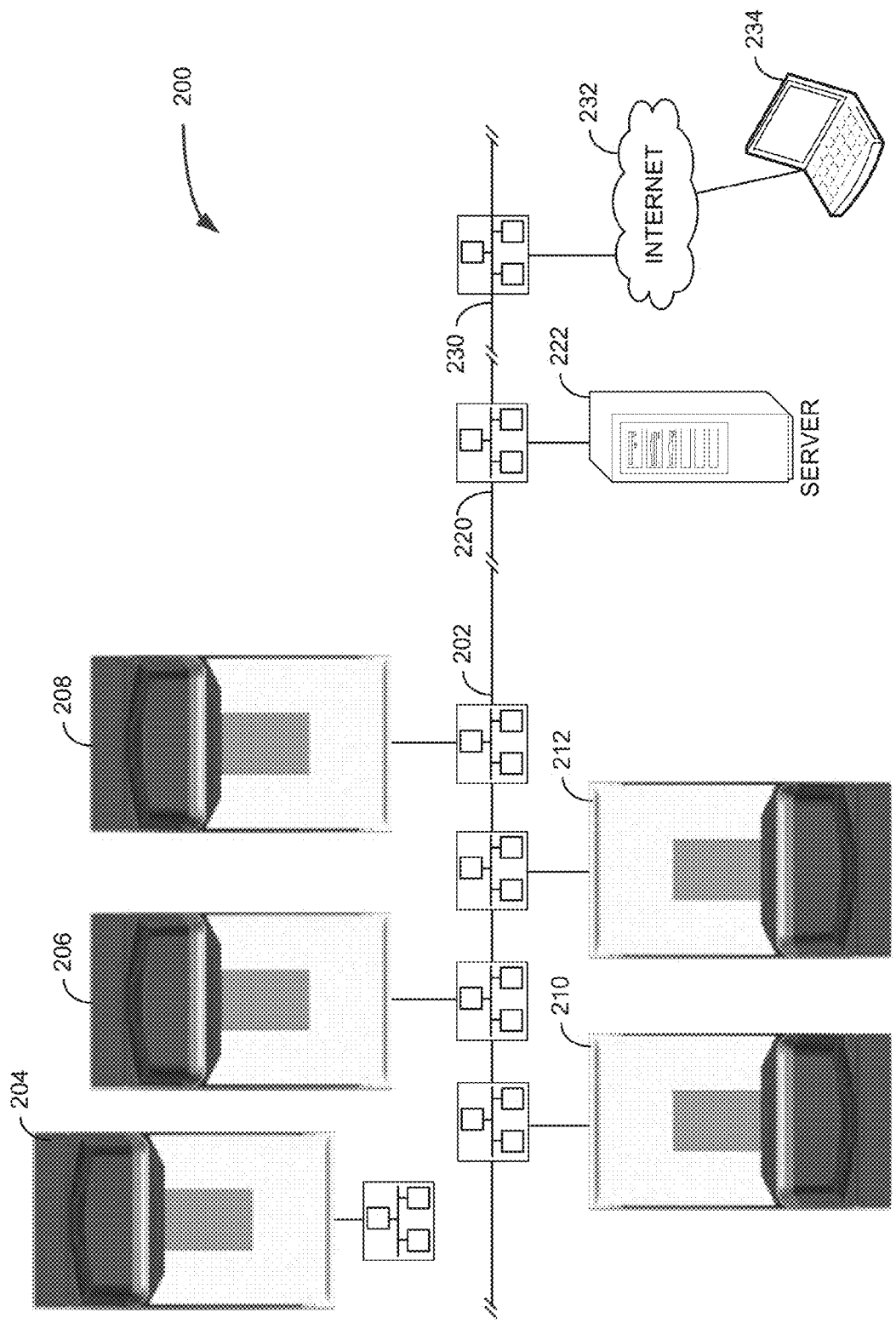
FIG. 2 is block diagram of networked system components, according an example embodiment.

FIG. 2 is block diagram of networked system 200 components, according an example embodiment. The networked system 200 is a view of a networked system including scanners 206, 208, 210, 212 connected to a network segment 202. The network segment 202 may be a stand-alone network, such as a network within a retail outlet. The network segment 202 may also be part of a larger network that includes additional network segments 220, 230. For example, the network segment 202 may be a store-based network that is also coupled a corporate network segment 220. The corporate network segment 220 may further be coupled to an internet 232 network segment 230.

The network segment 202 includes the plurality of scanners 206, 208, 210, 212 connected thereto. Although not illustrated, the scanners 206, 208, 210, 212 are each also typically coupled to terminals, such a POS terminals, self-service kiosks, and the other types of terminals discussed elsewhere herein. The system 200 also includes a scanner 204 that has not yet been connected to the network segment 202. In some embodiments, once the scanner 204 is connected to the network segment 202, a configuration process will execute within the scanner to automatically set its configuration. This may include discovering its configuration through communication with one or more of the other scanners 206, 208, 210, 212, requesting configuration setting data from a server 222 that may be accessible via the network segment 202, the corporate segment network 220, or the Internet 232 network segment 230. These configuration settings may include data to be stored on the scanner 204 as a local database of barcode data, which may include barcode data of secondary barcodes to suppress. Further, the configuration settings may also be pushed to, or otherwise remotely set to, the scanner 204 or to other scanners 206, 208, 210, 212 from the server or from a computing device 234 that may be connected to the Internet 234, the corporate network segment 220, or the network segment 202 via an interface of the scanners 204, 206, 208, 210, 212 as discussed above. In some embodiments, local databases of barcode data stored in the memories of the scanners 204, 206, 208, 210, 212 maybe synchronized via one or more of the network segments 202, 220, 230 via P2P processes that execute on the scanners 204, 206, 208, 210, 212, via a process on the server 222, or otherwise.

Figure 3:
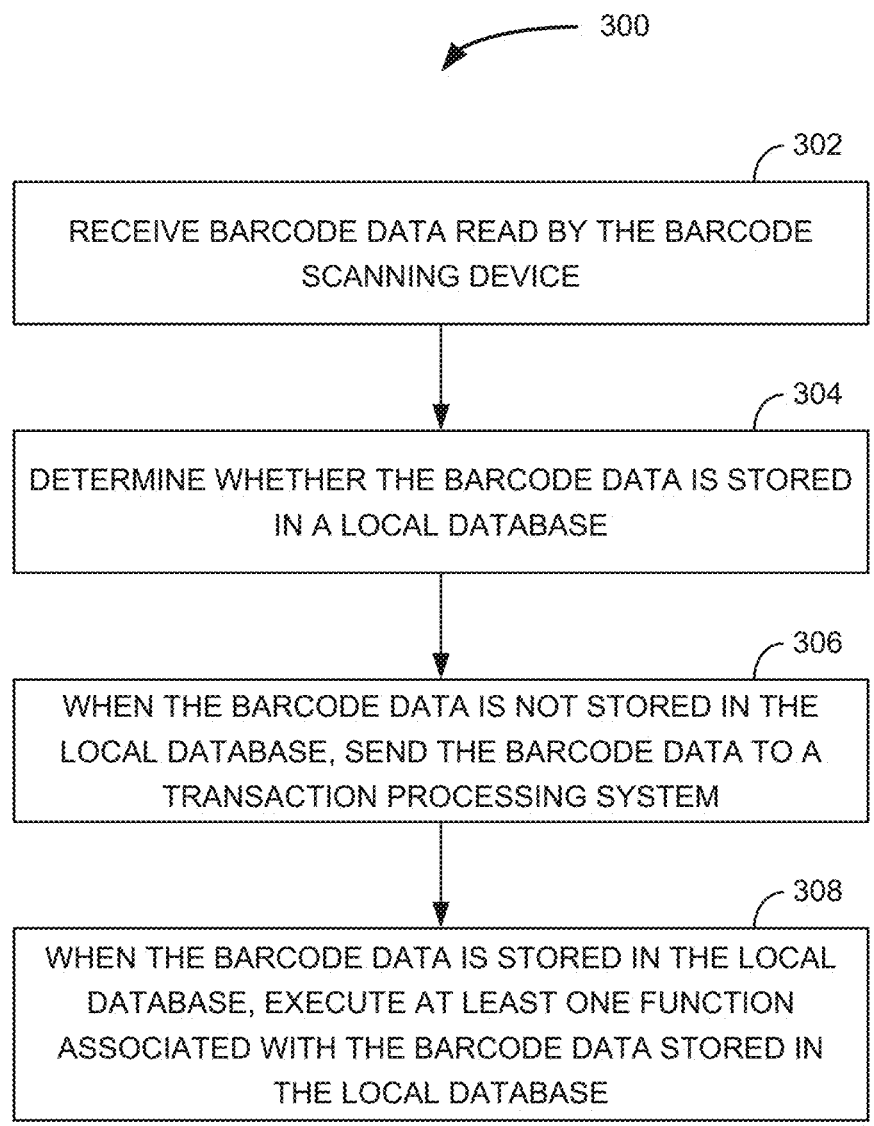
FIG. 3 is a block flow diagram of a method, according to an example embodiment.

FIG. 3 is a block flow diagram of a method 300, according to an example embodiment. The method 300 is an example of a method that may be performed on a scanner, such as the scanner 108 of FIG. 1. The method 300 includes receiving 302 barcode data read by the barcode scanning device, such as one of the one or more scanning devices 118 of the scanner 108 of FIG. 1. The barcode data may be received 302 by a firmware 126 or software 130 process of the scanner 108. The method 300 then determines 304 whether the barcode data is stored in a local database, such as may be stored in the configuration settings 128 or elsewhere in the memory 124 of the scanner 108 of FIG. 1. When the barcode data is determined as not stored in the local database, the method 300 may then send 306 the barcode data to a transaction processing system for processing, such as the POS system 104 of FIG. 1. However, when the barcode data is determined 304 to be stored in the local database, the method 300 may then execute 308 at least one function associated with the barcode data stored in the local database. In some instances, the function associated with the barcode data in the local database is a default function to ignore the received 302 barcode data. However, in other embodiments, the local database may store barcode data in records where at least one of the records includes data of or data associating barcode data to at least one barcode processing rule. An example of such a barcode processing rule may include a barcode processing rule executable by the processor 122 of the scanner 108 to ignore the received barcode data and to continue searching for another barcode to read. Another barcode processing rule may instead be executed to cause the received 302 barcode to be sent to the transaction processing system, such as the POS system 104 of FIG. 1.

In some embodiments of the method 300, after the barcode data is sent 306 to the transaction processing system, the device performing the method 300 then typically receives a response from the transaction processing system. When the received response indicates the barcode data was processed, the barcode scanner device continues searching for another barcode to read. However, in some embodiments, when the received response indicates the barcode data was not processed, the method 300 includes storing the barcode data as a new record in the local database. However, the storing of the barcode data to the database, in some embodiments, may not occur until the barcode data has been unsuccessfully processed by the transaction processing system at least a minimum number of times, such as two, three, or more times, depending on the particular embodiment which may also be subject to a configuration setting on the scanner or the transaction processing system. In some embodiments, a reply from the transaction processing system may include an instruction to add the barcode data to the local database.

Another embodiment is in the form of a scanner, such as the scanner 108 of FIG. 1. The scanner of such embodiments includes a communication interface device, at least one barcode reading device, at least one data processing device such as a processor, and at least one memory device. The at least one memory device stores, among other things, a local database of barcode data and instructions executable by the at least one data processing device. The instructions in such embodiments are executable by the at least one data processing device to perform data processing activities. These data processing activities may include receiving barcode data read by the barcode reading device and determining whether the barcode data is stored in the local database. In such embodiments, when the barcode data is not stored in the local database, the barcode data is then sent via the communication interface device to a transaction processing system. However, when the barcode data is stored in the local database, at least one function associated with the barcode data stored in the local database may then be executed.

Some embodiments of the scanner of such embodiments further include a network interface device. In such embodiments, the data processing activities further include synchronizing barcode data stored in the local database with a barcode data repository via the network interface device.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method performed on a barcode scanning device, the method comprising:
   receiving barcode data read by the barcode scanning device, the barcode data including secondary barcode data;
   determining whether the barcode data is stored in a local database;
   when the barcode data is not stored in the local database, sending the barcode data to a transaction processing system;
   when the barcode data is stored in the local database, executing at least one function associated with the barcode data stored in the local database; and
   wherein the local database stores barcode data in records, at least one of the records including data of or data associating barcode data to at least one barcode processing rule, the at least one barcode processing rule including a barcode processing rule executable by the barcode scanning device to ignore and discard the received barcode data and to continue searching for another barcode to read.

2. The method of claim 1, wherein the at least one function associated with the barcode data stored in the local database is at least one default function.

3. The method of claim 1, wherein after the barcode data is sent to the transaction processing system, the method further comprises:
   receiving a response from the transaction processing system, wherein:
      when the received response indicates the barcode data was processed, the barcode scanner device continues searching for another barcode to read; and
      when the received response indicates the barcode data was not processed storing the barcode data as a new record in the local database.

4. The method of claim 1, wherein the transaction processing system is a Point-Of-Sale (POS) terminal.

5. The method of claim 1; further comprising:
   transmitting data stored in the local database to a network location via a network interface device of the barcode scanning device.

6. The method of claim 1, wherein the local database includes barcode data received via a network interface device of the barcode scanning device.

7. A method comprising:
   determining whether secondary barcode data is stored in a local database of a barcode scanning device;
   when the barcode data is not stored in the local database, sending the barcode data to a transaction processing system;
   when the barcode data is stored in the local database, executing at least one function associated with the barcode data stored in the local database;
   receiving a reply from transaction processing system indicating whether the barcode data was processed;
   when the reply from the transaction processing system indicates the barcode data was not processed, storing the barcode data in the local database in association with at least one function executable to cause subsequent reads of the barcode data to be ignored by the barcode scanning device; and
   when the reply from the transaction processing system indicates the barcode data was processed, returning the barcode scanning device to a barcode searching mode.

8. The method of claim 7, wherein the local database stores barcode data in records, at least one of the records including data of or data associating barcode data to at least one barcode processing rule.

9. The method of claim 8, wherein the at least one barcode processing rule includes a barcode processing rule executable by the barcode scanning device to ignore the received barcode data and to continue searching for another barcode to read.

10. The method of claim 7, wherein the at least one function associated with the barcode data stored in the local database is at least one default function.

11. The method of claim 7, wherein the transaction processing system is a Self-Service Terminal (SST) of which the barcode scanning device is a part.

12. The method of claim 11, wherein the SST is a self-checkout Point-Of-Sale (POS) system.

13. A scanner comprising:
   a communication interface device;
   at least one barcode reading device;
   at least one data processing device;
   at least one memory device storing a local database of barcode data and instructions executable by the at least one data processing device, the instructions executable by the at least one data processing device to perform data processing activities, the data processing activities comprising:
      receiving secondary barcode data read by the barcode reading device;
      determining whether the barcode data is stored in the local database;
      when the barcode data is not stored in the local database, sending the barcode data via the communication interface device to a transaction processing system;
      when the barcode data is stored in the local database, executing at least one function associated with the barcode data stored in the local database; and wherein the local database stores barcode data in records, at least one of the records including data of or data associating barcode data to at least one barcode processing rule, the at least one barcode processing rule includes a barcode processing rule executable by the at least one data processing device to ignore the received barcode data and to continue searching for another barcode to read via the at least one barcode reading device.

14. The scanner of claim 13, further comprising:

a network interface device; and wherein the data processing activities further comprise:

synchronizing barcode data stored in the local database with a barcode data repository via the network interface device.

15. The scanner of claim 13, wherein the at least one function associated with the barcode data stored in the local database is at least one default function.

16. A method performed on a barcode scanning device, the method comprising:

receiving barcode data read by the barcode scanning device;

determining whether the barcode data is stored in a local database, wherein the local database stores barcode data in records, at least one of the records including data of, or data associating barcode data to, at least one barcode processing rule including a rule to ignore the received barcode data and to continue searching for another read;

when the barcode data is not stored in the local database, sending the barcode data to a transaction processing system; and when the barcode data is stored in the local database, executing the at least one barcode processing rule associated with the barcode data stored in the local database.

\* \* \* \* \*